United States Patent [19]

Harada

[11] Patent Number: 4,508,428
[45] Date of Patent: Apr. 2, 1985

[54] INK PROJECTIONS ON THE POLARIZER OF AN ELECTRO-OPTIC DISPLAY

[75] Inventor: Yuji Harada, Tokyo, Japan

[73] Assignee: Canon Kabushiki Kaisha, Tokyo, Japan

[21] Appl. No.: 345,667

[22] Filed: Feb. 4, 1982

[30] Foreign Application Priority Data

Feb. 16, 1981 [JP] Japan .................................. 56-21124

[51] Int. Cl.³ .............................................. G02F 1/133
[52] U.S. Cl. ................................ 350/337; 350/339 D
[58] Field of Search ........... 350/370, 337, 338, 339 D, 350/349

[56] References Cited

U.S. PATENT DOCUMENTS

| 1,610,423 | 1/1921 | Cawley | 350/370 X |
| 3,291,550 | 1/1959 | Bird et al. | 350/370 |
| 3,865,469 | 2/1975 | Asai et al. | 350/349 |
| 3,912,369 | 10/1975 | Kashnow | 350/341 X |
| 3,914,022 | 10/1975 | Kashnow | 350/341 X |
| 4,106,859 | 8/1978 | Doriguzzi et al. | 350/338 |
| 4,227,777 | 10/1980 | Murakami | 350/337 X |
| 4,390,245 | 6/1983 | Shimizu et al. | 350/343 |
| 4,398,804 | 8/1983 | Yokoi | 350/337 |

FOREIGN PATENT DOCUMENTS

| 2744034 | 3/1979 | Fed. Rep. of Germany | 350/338 |
| 3017551 | 11/1981 | Fed. Rep. of Germany | 350/337 |
| 43507 | 3/1980 | Japan | 350/349 |

Primary Examiner—John K. Corbin
Assistant Examiner—David Lewis
Attorney, Agent, or Firm—Fitzpatrick, Cella, Harper & Scinto

[57] ABSTRACT

An electro-optic device comprising a polarizing plate or a polarizing film is characterized in that said electro-optic device is provided with a plurality of projections on at least one of the surface of the polarizing plate or the polarizing film opposing to a substrate, and the surface of the substrate opposing to the polarizing plate or film.

6 Claims, 4 Drawing Figures

INK PROJECTIONS ON THE POLARIZER OF AN ELECTRO-OPTIC DISPLAY

BACKGROUND OF THE INVENTION

1. Field of the Invention

The present invention relates to an electro-optic device and more specifically to a liquid crystal display device which prevents generation of interference fringes.

2. Description of the Prior Art

A liquid crystal display device is generally provided with one or two polarizing plate or film (hereinafter abbreviated as "polarizer"). For example, U.S. Pat. No. 3,731,986 and British Patent No. 1372868 disclose a liquid crystal display device in which twisted "Np liquid crystal" (an abbreviation for nematic liquid crystal having a positive dielectric anisotropy) is held between a pair of polarizers being oriented parallel to one another or crossed. In addition, there is known a guest-host optic device in which one polarizer is arranged at the light incidence side in "Applied Physics Letter" Vol. 13, No. 3 (Aug. 1, 1968) pp. 91–92.

The polarizer used for the conventional liquid crystal display device is stuck on a glass substrate by means of an adhesive. However, the yield of this process is poor, since bubbles occur after sticking because of introduction of air upon sticking. Therefore, an upper polarizer for the liquid crystal display device is recently overlaid on a glass substrate upon manufacturing the device without sticking. However, in this manufacturing process, when the upper polarizer has a large warp, a part of the vertex of the warp contacts with the glass substrate, so that the display information of the display device is sometimes hard to view owing to generation of interference fringes at the part of contact. In order to solve this drawback, generation of interference fringes is prevented by inserting a picture frame shaped spacer between the polarizer and the glass substrate for the display device. However, this process is not economical in cost, since the spacer is difficult to be handled upon manufacturing owing to being thin and shaped like a picture frame and the large number of parts.

SUMMARY OF THE INVENTION

An object of the present invention is to provide an electro-optic device and more particularly a liquid crystal display device preventing generation of interference fringes.

Another object of the present invention is to provide an electro-optic device and more particularly a liquid crystal display device capable of improving yield upon manufacturing.

According to the present invention, there is provided an electro-optic device comprising a polarizing plate or a polarizing film, characterized in that said electro-optic device is provided with a plurality of projections on at least one of the surface of the polarizing plate or the polarizing film opposing to a substrate, and the surface of the substrate opposing to the polarizing plate or film.

DESCRIPTION OF THE PREFERRED EMBODIMENTS

Figure 1:
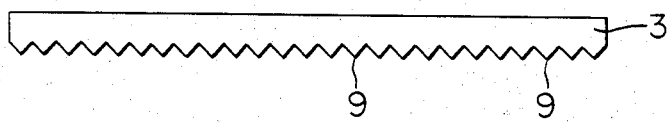
FIG. 1 is a sectional view of a polarizer used for an electro-optic device according to the present invention.

The present invention will be illustrated referring to the drawings.

FIG. 1 shows a polarizer 3 having a plurality of projections 9 usable for an electro-optic device according to the present invention. The surface of the polarizer 3 shown in FIG. 1 is provided with rugged or ripply projections 9 having a fine structure. The projections 9 can be formed by roughing the surface of the polarizer. For example, the polarizer may be treated by the sandblast or by application of an etchant by means of soak or spray, followed by drying. In an embodiment of the present invention, it is preferable to make the polarizer 3 having transparency with minimizing quantity of the diffused light produced by the projections 9 resulting from the roughing treatment as mentioned above. In another embodiment, a polarizer having projection formed by a usual non-glare treatment can be also available.

In addition, the projections 9 can be formed by such method as pressing, stamping, and the like. As the pressing method, for example, the projections 9 can be formed by passage between press rollers in which one roller has a rugged surface. Further, the projections 9 can be formed by pressing a suitable hard core-like member on the predetermined portion of the polarizer.

It is preferable that such polarizer 3 is arranged at the light incidence side of an electro-optic device.

It is preferable that the projections 9 on the polarizer 3 have a fine structure which produces interference fringes in the invisible extent upon contacting the polarizer with a surface of a substrate (of glass or plastics). In addition, according to the present invention, the projections 9 having the fine structure as mentioned above can be provided over the whole effective display surface of an electro-optic device. Of course, in the present invention, it is possible to reduce the number of the projections or the area where the projections are provided, so far as the projections do not lose the functions of the spacer, instead of providing the projections having a fine structure over the whole effective display surface.

Figure 2:
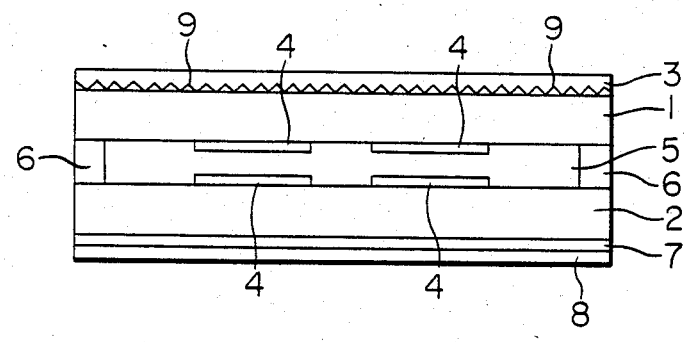
FIGS. 2, 3 and 4 are sectional views of electro-optic devices according to the present invention.

FIG. 2 shows an electro-optic device wherein a polarizer having a plurality of projections is arranged at the light incidence side of a sandwich-structure holding an electro-optic material, particularly, liquid crystal by a pair of substrates, each having electrodes.

In FIG. 2, numerals 1 and 2 show substrates, each having electrodes 4. The substrates 1 and 2 can be made of glass plates, plastic plates, and the like. As the electrodes 4, there may be employed transparent metal oxide such as indium oxide, tin oxide, and the like, or metals such as aluminum, copper, silver, and the like. Electrodes on at least one substrate are made of transparent electroconductive films. Numerals 3 and 7 show polarizers. The polarizer 3 is the rugged polarizer having the projections 9 as shown in FIG. 1 on the surface facing to the substrate 1. Therefore, the polarizer 3 can be arranged on the substrate 1 with the predetermined space and the liquid crystal display can not be impaired by the interference fringes produced in the vicinity of the substrate 1 and the projections 9, since the interference fringes are invisible. The lower polarizer 7 is allowed to adhere to both the substrate 2 and a diffusion-reflection plate 8.

The space between the polarizer 3 and the substrate 1, which is formed by the projection 9, is usually up to 500μ, preferably 5–200μ.

As the polarizers 3 and 7, there may be used, for example, polyhalogen polarizing films, dyestuff polarizing films polyvinylene polarizing films, infrared polarizing films, and the like. A numeral 6 represents a sealing member which may be formed with an epoxy resin and the like by means of the screen printing method. In addition, the electroconductive film may be formed with indium oxide or tin oxide by means of the deposition process or the screen printing method.

Since the electro-optic device shown in FIG. 2 is provided with the projections 9 having a fine structure capable of reducing the generation of interference fringes to the invisible extent, it is possible, for example, upon effecting a liquid crystal display to view a display substantially free from interference fringes. In addition, it is possible to prevent the generation of interference fringes by another embodiment.

Figure 3:
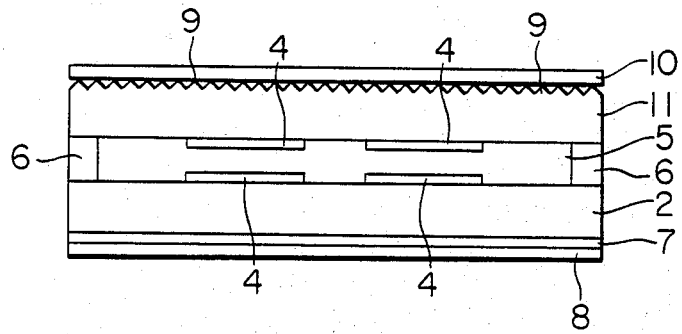

FIG. 3 shows an electro-optic device which is provided with a plurality of projections on a surface of a substrate arranged at the light incidence side of a sandwich-structure, in which an electro-optic material, particularly liquid crystal, is held between a pair of substrates, each having electrodes, the surface facing to a polarizer. In this device, a polarizer 10 having a flat surface is overlaid on a plurality of projections 9 of a substrate 11. It is preferable that the projections 9 comprise a fine structure capable of reducing the generation of interference fringes to the invisible extent upon contacting with a polarizer 10. In this case, it is desirable that quantity of light diffused by the projections 9 is as little as possible.

The projections 9 may be formed by a suitable process depending upon the material of the substrate, for example, by the sand-blast or by a method using an etchant. In this case, the projections 9 may be formed over the whole surface of the substrate 11. Alternatively, it is possible to reduce the number of the projections 9 or the area where the projections 9 are provided, so far as projections 9 do not impair the functions of the spacer.

Figure 4:
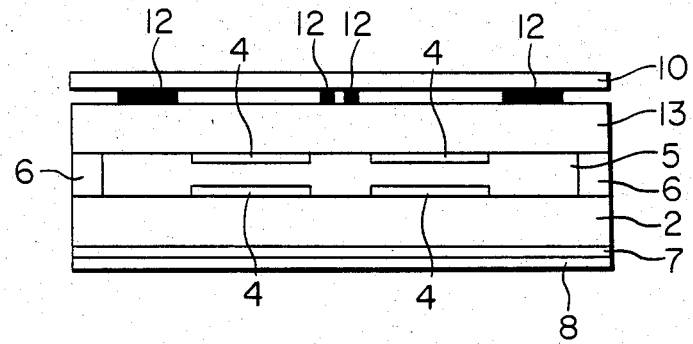

In another embodiment, as shown in FIG. 4, there may be used projections constituted of a printing ink layer 12 sandwiched between a plane polarizer 10 and a plane substrate 13, which comprises such shape as literature, figure or mark produced by the screen printing process and the like. In this case, the projections constituted of the printing ink layer 12 can be formed in such a way that a printing ink is applied to the substrate 13 or the polarizer 10, followed by drying.

As an electro-optic material 5 used for the electro-optic device according to the present invention, it is particularly preferable to use liquid crystal. In this case, as the display method utilizable for the electro-optic device, there may be mentioned a method utilizing a dynamic scattering phenomenon in which Nn liquid crystal (an abbreviation for nematic liquid crystals having a negative dielectric anisotropy) scatters light by application of an electric field, a method in which optical rotation is imparted with twisted Np liquid crystals so that the optical rotation is changed by action of a suitable electric field to be utilized for display, or a method utilizing the guest-host effect. As liquid crystal, other than the above-mentioned nematic liquid crystal, there may also be used smetic liquid crystal or cholesteric liquid crystal, singly, or a combination of two or more species.

In addition, the present invention can be employed for a liquid crystal display device having a multi-layer cell structure.

The interference fringes generated between the substrate and the polarizer can be prevented by the present invention. Accordingly, it can be omitted to use a picture frame shaped spacer used for prevention of generation of the interference fringes. Consequently, the present invention is effective to reduce the manufacturing cost.

In the present invention, the number of the projections 9 must be determined within the scope wherein the projections function as a spacer so as to minimize the diffusion of light. Alternatively, when the diffusion function of a diffusion-reflection plate arranged at the rear of a liquid crystal display device is omitted, the projections 9 may be formed on the polarizer or on the substrate within the scope wherein the projections possess the diffusion function in a similar extent to the diffusion-reflection plate. In addition, it is preferable that the printing ink layer 12 is arranged between the substrate and the polarizer to the extent that an effective display area of liquid crystal is disturbed.

I claim:
1. An electro-optic device comprising:
   (a) a liquid crystal cell including first and second substrates, each having an electrode, defining a gap therebetween, the periphery of said gap being sealed with a sealing member, and said gap is filled with a liquid crystal material;
   (b) a first polarizing means placed at the front side of said first substrate; and
   (c) a second polarizing means placed at the back side of said second substrate, characterized in that a printing ink layer is formed between said first substrate and said first polarizing means at least within an effective display region of said liquid crystal cell.

2. An electro-optic device according to claim 1, wherein said liquid crystal material is a nematic liquid crystal having a positive dielectric anisotropy and a twisted alignment.

3. An electro-optic device according to claim 1, wherein said liquid crystal material is a nematic liquid crystal having a negative dielectric anisotropy and a twisted alignment.

4. An electro-optic device according to claim 1, wherein said liquid crystal contains a dichroic dye.

5. The electro-optic device according to claim 1 wherein said printing ink layer is formed in a pattern of a character, a letter, a numeral or a mark within said effective display region of the liquid crystal cell.

6. The electro-optic device according to claim 1, wherein a diffusion-reflector is disposed at the back of said second polarizing plate.

* * * * *